US008615024B2

(12) United States Patent
Park et al.

(10) Patent No.: US 8,615,024 B2
(45) Date of Patent: Dec. 24, 2013

(54) DATA TRANSMISSION METHOD IN SENSOR NETWORK

(75) Inventors: Noseong Park, Daejeon (KR); Yoonmee Doh, Daejeon (KR); Jong-Arm Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 609 days.

(21) Appl. No.: 12/816,447

(22) Filed: Jun. 16, 2010

(65) Prior Publication Data

US 2011/0128898 A1 Jun. 2, 2011

(30) Foreign Application Priority Data

Nov. 27, 2009 (KR) .......................... 10-2009-0115904

(51) Int. Cl.
*H04J 3/18* (2006.01)
*H04L 12/28* (2006.01)
*H04L 12/43* (2006.01)

(52) U.S. Cl.
USPC .......................... 370/477; 370/395.4; 370/461

(58) Field of Classification Search
USPC .......... 370/231, 252, 254, 389, 390, 392–394, 370/395.3, 395.4, 401, 445, 447, 474–477; 709/232, 236, 246
See application file for complete search history.

(56) References Cited

U.S. PATENT DOCUMENTS

| 7,583,651 B2 * | 9/2009 | Yamada et al. | 370/345 |
|---|---|---|---|
| 2005/0171662 A1 * | 8/2005 | Strege et al. | 701/33 |
| 2006/0187866 A1 * | 8/2006 | Werb et al. | 370/311 |
| 2007/0133583 A1 * | 6/2007 | Kim et al. | 370/412 |
| 2008/0013519 A1 * | 1/2008 | Kwon et al. | 370/345 |
| 2008/0259919 A1 * | 10/2008 | Monga | 370/389 |
| 2009/0088605 A1 * | 4/2009 | Ross et al. | 600/300 |
| 2009/0122733 A1 * | 5/2009 | Ruy et al. | 370/310 |
| 2009/0185548 A1 * | 7/2009 | Pratapagiri | 370/346 |
| 2009/0323571 A1 * | 12/2009 | Arvind et al. | 370/311 |
| 2010/0077404 A1 * | 3/2010 | Oh et al. | 719/313 |
| 2010/0232324 A1 * | 9/2010 | Radunovic et al. | 370/277 |
| 2011/0182222 A1 * | 7/2011 | Patel et al. | 370/311 |
| 2011/0211461 A1 * | 9/2011 | Bahr et al. | 370/245 |
| 2011/0211513 A1 * | 9/2011 | Coleri Eregen et al. | 370/311 |

FOREIGN PATENT DOCUMENTS

| JP | 2006-129102 | 5/2006 |
|---|---|---|
| KR | 10-0923166 | 10/2009 |
| KR | 10-0931781 | 12/2009 |

OTHER PUBLICATIONS

"Required Changes for Low Energy Extension", RIT (Receiver Initiated Transmission), IEEE 802.15.4e Low-energy Subgroup, pp. 1-18 (2009).

* cited by examiner

*Primary Examiner* — Redentor Pasia
(74) *Attorney, Agent, or Firm* — Staas & Halsey LLP

(57) ABSTRACT

Provided is a data transmission method of a plurality of sending nodes in a sensor network. In the data transmission method, data is generated to be transmitted to a receiving node, respectively. Headers of the generated data are transmitted to the receiving node, respectively, in response to a Wake-up Notification Message (WNM) from the receiving node. A Grant Notification Message (GNM) for selecting one of the plurality of sending nodes is received from the receiving node. The plurality of sending nodes transmit a payload of the generated data according to the GNM, or switch into sleep mode without data transmission.

17 Claims, 7 Drawing Sheets

DATA TRANSMISSION METHOD IN SENSOR NETWORK

CROSS-REFERENCE TO RELATED APPLICATIONS

This U.S. non-provisional patent application claims priority under 35 U.S.C. §119 of Korean Patent Application No. 10-2009-0115904, filed on Nov. 27, 2009, the entire contents of which are hereby incorporated by reference.

BACKGROUND OF THE INVENTION

The present invention disclosed herein relates to a sensor network, and more particularly, to a data transmission method in a sensor network applied with a synchronous Receiver Initiated Transmission (RIT) low-power MAC protocol.

Sensor networks are used to provide services such as monitoring, tracing, reconnoitering, and automation using a plurality of communication nodes having abilities of sensing, processing, and communication. The sensor networks are means not for communication but for automated remote information collection. Particularly, Wireless Sensor Networks (WSNs) consist of sensor nodes having limited performances. The sensor nodes measure and collect information on surrounding environments in which respective sensor nodes are deployed. The collected information is delivered to a remote server or user through a wireless interface and a broadband network.

In the WSN, sensor nodes are low-priced devices operated by batteries. Accordingly, the life of a sensor node is limited to the life of a battery. This is because a battery can not be recharged or replaced even though the sensor node is paused when the battery dies.

Accordingly, WSNs require efficient power management to maximize the life of the network.

To meet these requirements, an asynchronous low-power MAC protocol of an RIT type has been proposed to assure reliability of sensor node and reduce power consumption. According to the asynchronous low-power MAC protocol of the RIT type, the reliability of a sensor node can be assured, and power consumption can be reduced. In order to reflect this trend, a RIT method has been proposed as a standard draft in IEEE 802.15.4e Low-Energy Subgroup that are standards related to sensor networks.

The asynchronous low power MAC protocol of the RIT type requires transmitting/receiving methods for protecting data conflict and expanding the life of a sensor node.

SUMMARY OF THE INVENTION

The present invention provides a data transmission method in a sensor network, which can reduce conflicts between sensor nodes and elongate the life of a battery.

Embodiments of the present invention provide data transmission methods of a plurality of sending nodes in a sensor network including: generating data to be transmitted to a receiving node, respectively; transmitting headers of the generated data to the receiving node, respectively, in response to a Wake-up Notification Message (WNM) from the receiving node; receiving a Grant Notification Message (GNM) for selecting one of the plurality of sending nodes from the receiving node; and transmitting, by the plurality of sending nodes, a payload of the generated data according to the GNM, or switching into sleep mode without data transmission.

In other embodiments of the present invention, data reception methods of a receiving node in a sensor network include: receiving headers of data generated by a plurality of sending nodes; selecting one of the plurality of sending nodes by referring to the received headers; transmitting a GNM to the selected sending node; and receiving a payload of the data provided from the selected sending node.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
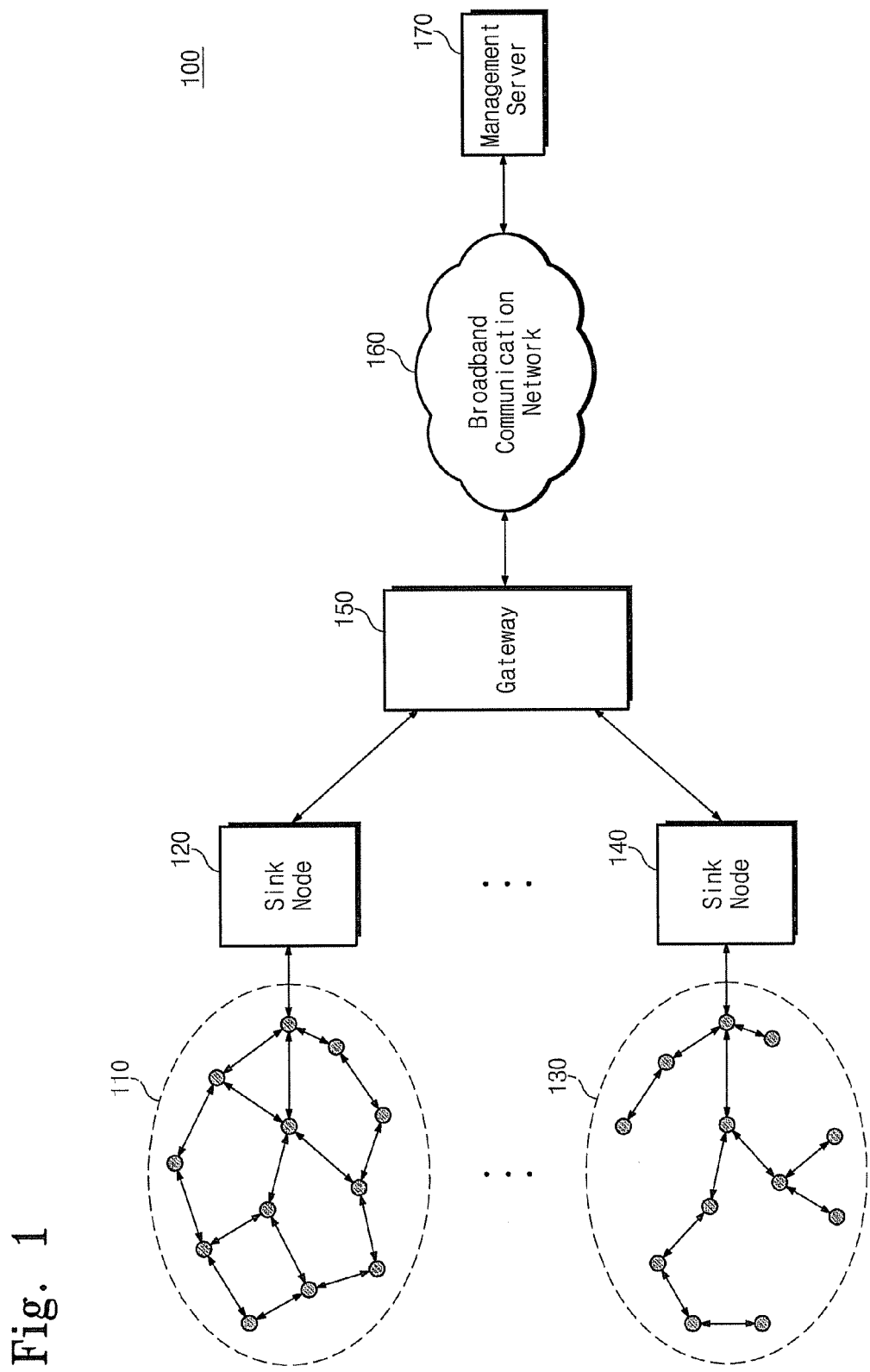
FIG. 1 is a block diagram illustrating a sensor network according to an embodiment.

FIG. 1 is a block diagram illustrating a sensor network 100 according to an embodiment. The sensor network 100 may include sensor nodes 110 and 130 and Sink nodes 120 and 140, a gateway 50, a broadband communication network 160, and a management server 170.

The sensor nodes 110 and 130 may be located in sensing fields necessary for data collection. The sensing field refers to an area or a location that is a target of the data collection. The sensor nodes 110 and 130 may be installed in the sensing fields to constitute the sensor network 100. The sensor nodes 110 and 130 may acquire detection information monitored periodically and response information responding a specific event from the sensing fields. The acquired information may be processed by the sensor nodes 110 and 130, and may be delivered to adjacent sensor nodes or the sink nodes 120 and 140.

Routing scheme for delivering the detected information sensed by sensor nodes may be set by various methods. As a networking set by sensor nodes, there are a tree-type network 130 such as point-to-point or point-to-multipoint and a mesh-type network 110 that communicate with all sensor nodes within a communication distance. Besides, there may be other networking methods for communication.

The sink nodes 120 and 140 may collect the sensing information collected from the sensor node 110 and 130. The sink nodes 120 and 140 may deliver the collected sensing information to the gateway 150. In order to provide such a function, the sink nodes 120 and 140 need to have relatively greater processing abilities in hardware and software than sensor nodes.

The gateway 150 may deliver data collected by the sink nodes 120 and 140 to the management server 170 through the broadband communication network 160. The gateway 150 may be connected to the broadband communication network 160 using various communication protocols, and may be configured to exchange data with the management server 170.

Generally, it is difficult for the sensor nodes 110 and 130 or the sink nodes 120 and 140 to access the broadband communication network 160 directly. This is because these nodes do not have enough computational resources to accept networks (LAN, WLAN, CDMA, WiBro, and Satellite) that can access the broadband communication network 160. Accordingly, the gateway 50 may provide a function of communicating with an external network that the sensor nodes 110 and 130 or the sink nodes 120 and 140 do not have.

The broadband communication network 160 refers to various communication networks such as Internet that can easily provide collected information to a user. Also, the broadband communication network 160 may allow a user's request to be easily delivered to the sensor nodes 110 and 130.

The management server 70 may monitor the collected sensing information, and control respective sensor nodes according to the monitored data by a user's decision. For example, a sensor node equipped with an actuator may be ordered to perform a specific operation.

Data transmission between the sensor nodes 110 and 130 or the sensor nodes 110 and 130 and the sink nodes 120 and 140 may be performed according to an embodiment. That is, sending nodes may transmit only headers of a packet generated in response to a Wake-up Notification Message (WNM) of a receiving node. The receiving node may allow data transmission to only one sending node by referring to the received headers. Thereafter, a sending node allowed to transmit data may send payload of the data to the receiving node.

Here, the receiving node may transmit a WNM including a first time M during which the receiving node is maintained in a wake-up state. Also, after the receiving node is woken up, a second time M' when the receiving node is woken up next time may be included in the WNM. The sending nodes may reduce a stand-by time for data transmission/reception by referring to the WNM (including M or M').

Figure 2:
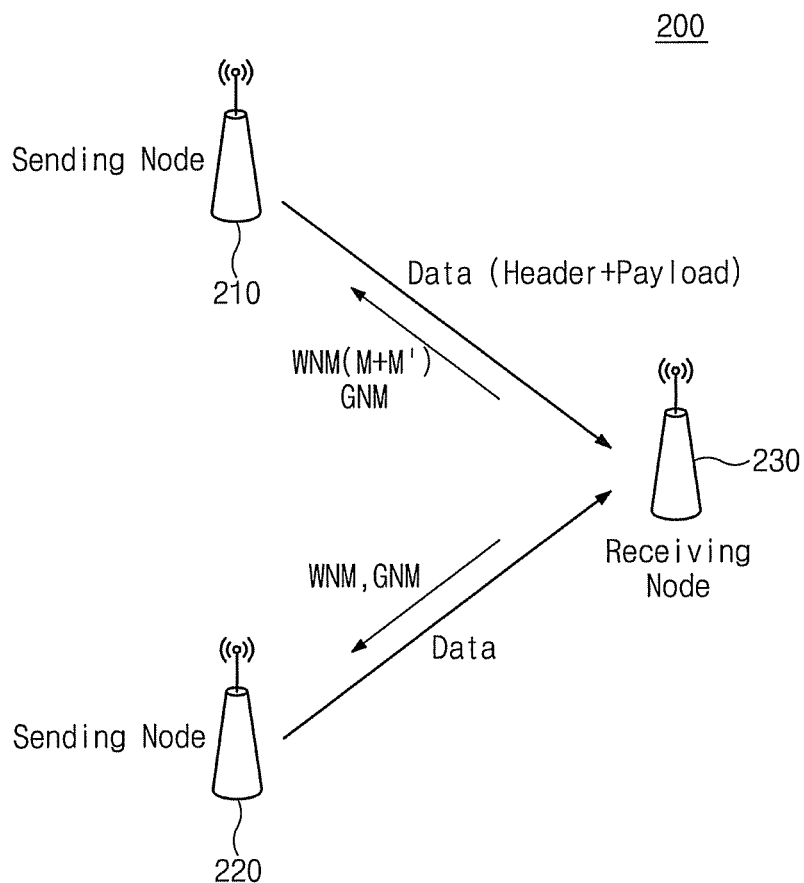
FIG. 2 is a diagram illustrating sending/receiving nodes according to an embodiment.

FIG. 2 is a diagram illustrating sending/receiving nodes according to an embodiment. Referring to FIG. 2, for convenience of explanation, two sending nodes 210 and 220 and one receiving node 230 are shown in FIG. 2.

The two sending nodes 21 and 220 may compete with each other to transmit generated data to the receiving node 230. The receiving node 230 may transmit a WNM to the sending nodes 210 and 220 when woken up. Then, the sending nodes 210 and 220 may primarily transmit only headers of the generated data to the receiving node 230. The receiving node 230 may transmit a Grant Notification Message (GNM) to, for example, the sending node 210 corresponding to the earliest received header. Then, the sending node 210 may transmit payloads of the generated data to the receiving node 230. When the transmission is completed, the sending node 210 may switch the operation mode into sleep mode. However, the sending node 220 that does not receive a transmission approval may be switched into the sleep mode immediately in response to a GNM.

Here, time when the sending nodes having entered the sleep mode are woken up may be determined by referring to the time M' included in the WNM transmitted from the receiving node 230. Also, a relation between the sending node and the receiving node is not limited only to the sensor nodes. That is, the sending node and the receiving node may represent data transmission relation between mutual sensor nodes or a sensor node and a sink node.

Figure 3:
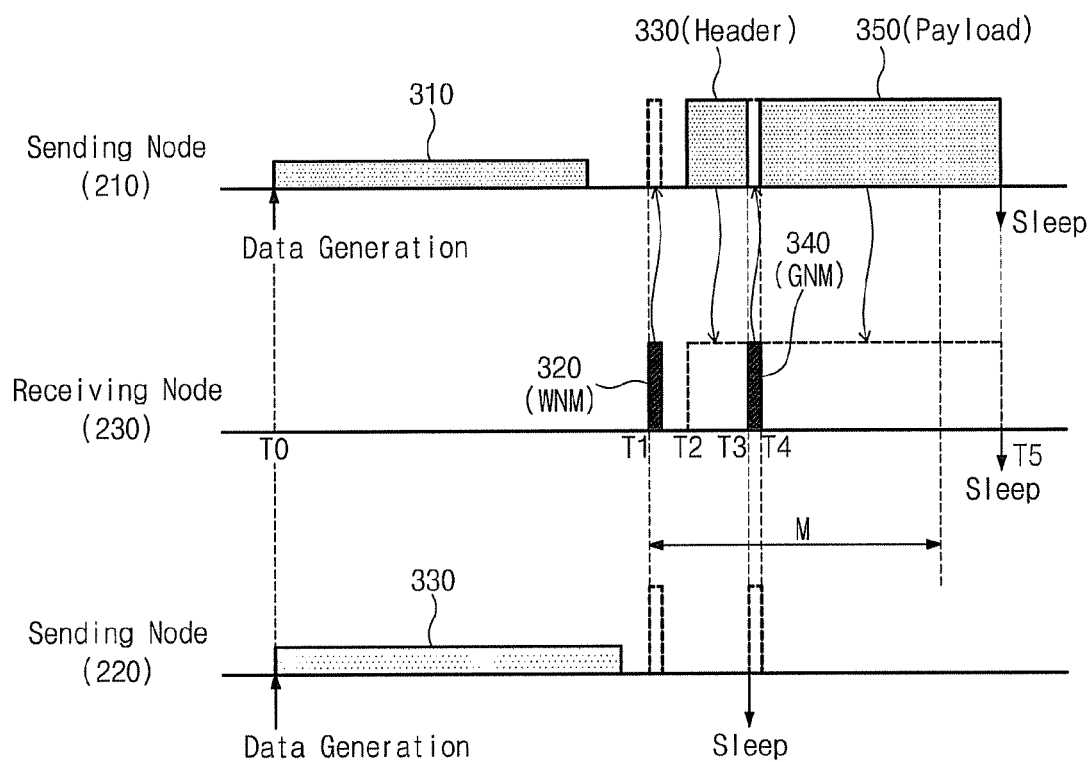
FIG. 3 is a timing diagram illustrating a data transmission method according to an embodiment.

FIG. 3 is a timing diagram illustrating an access method between nodes according to an embodiment. Referring to FIG. 3, sending nodes 210 and 220 may compete with each other to transmit generated data to a receiving node.

The sending nodes 210 and 220 may generate data through a procedure (for example, encoding) for transmitting sensing information or control information to a receiving node 230. Although data generation time is shown as T0 in FIG. 3, embodiments are not limited thereto. If the generation of data is completed, the sending nodes 210 and 220 may wait for a WNM 320 from the receiving node 230.

If the receiving node 230 is woken up at a time T1, the receiving node 230 may transmit the WNM 320 to the sending nodes 210 and 220. The WNM 320 may include a first time M when the receiving node 230 is again switched into the sleep mode after woken up.

The sending nodes 210 and 220 may transmit a header 330 of the generated data to the receiving node 230 by referring to the first time M. Here, for convenience of explanation, it is assumed that the sending node 210 transmits the header 330 earlier. At a time T2, the header 330 transmitted by the sending node 210 may be delivered to the receiving node 230.

At a time T3, when the header 330 is normally received, the receiving node 230 may transmit a GNM 340 to the sending nodes 210 and 220. The GNM 340 may be a message of authorizing only the sending node 210 to transmit data.

At a time T4, the sending node 210 may transmit a payload 350 of the generated data to the receiving node 230 in response to the GNM 340 from the receiving node 230. On the other hand, the sending node 220 may recognize that the data transmission authority was granted to another sending node, and enter the sleep mode. When the transmission of the payload 350 is completed within a notified wake-up time by the first time M, the sending node 210 may enter the sleep mode immediately after the transmission of the payload 350 is completed. The receiving node 230 may enter the sleep mode when the notified wake-up time by the first time M elapses.

However, the transmission of the payload 350 from the sending node 210 may exceed the notified wake-up time. In this case, the receiving node 230 may continue the transmission of the payload 350 even though the notified wake-up time elapses. Then, the receiving node 230 may enter the sleep mode after the transmission of the payload 350 is completed. The receiving node 230 may not enter the sleep mode until the transmission of the payload 350 is completed even though the notified wake-up time elapses. At a time T5 when the transmission of the payload 350 from the sending node 210 is completed, the receiving node 230 may enter the sleep mode.

According to the data transmission method described above, the sending nodes 21 and 220 may transmit only the header 330 of the packet generated in response to the WNM from the receiving node 230. The receiving node 230 may selectively grant the transmission authority to the sending nodes by referring to the header 330. Only a sending node granted with the transmission authority may transmit payload of data. Other sending nodes that are not granted with the transmission authority may enter the sleep mode immediately. This data transmission method can avoid data conflicts between sending nodes, and enhance reliability of transmission data.

In addition, the amount of the wake-up time that is prescribed by the first time M in the WNM 320 transmitted by the receiving node 230 may be variably adjusted according to the number of the adjacent sending nodes. That is, as the number of the sending nodes transmitting data to the receiving node 230 increases, the number of the headers to be transmitted may increase. Accordingly, the wake-up time of the receiving node that can accept the headers need to be assured. Therefore, a greater number of the sending nodes requires a greater wake-up time M.

Figure 4:
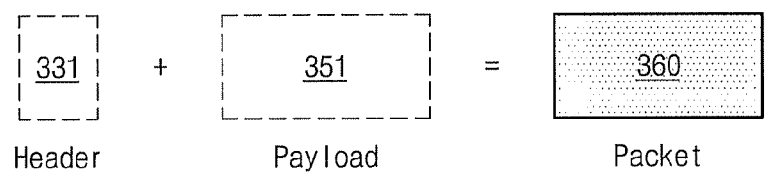
FIG. 4 is a block diagram illustrating a header and a payload in a receiving node.

FIG. 4 is a block diagram illustrating a header 331 and a payload 351 received by a receiving node 230. A packet generated by the sending node 210 may be divided into a header 330 and a payload 350 to be transmitted to the receiving node 230. Accordingly, the integrity test of the packet using a Frame Check Sequence (FCS) performed in the receiving node 230 may be performed after the transmission of the payload 351 is complete. That is, the previously-received header 331 and the later-received payload 351 may be combined to be processed as a full packet 360.

Figure 5:
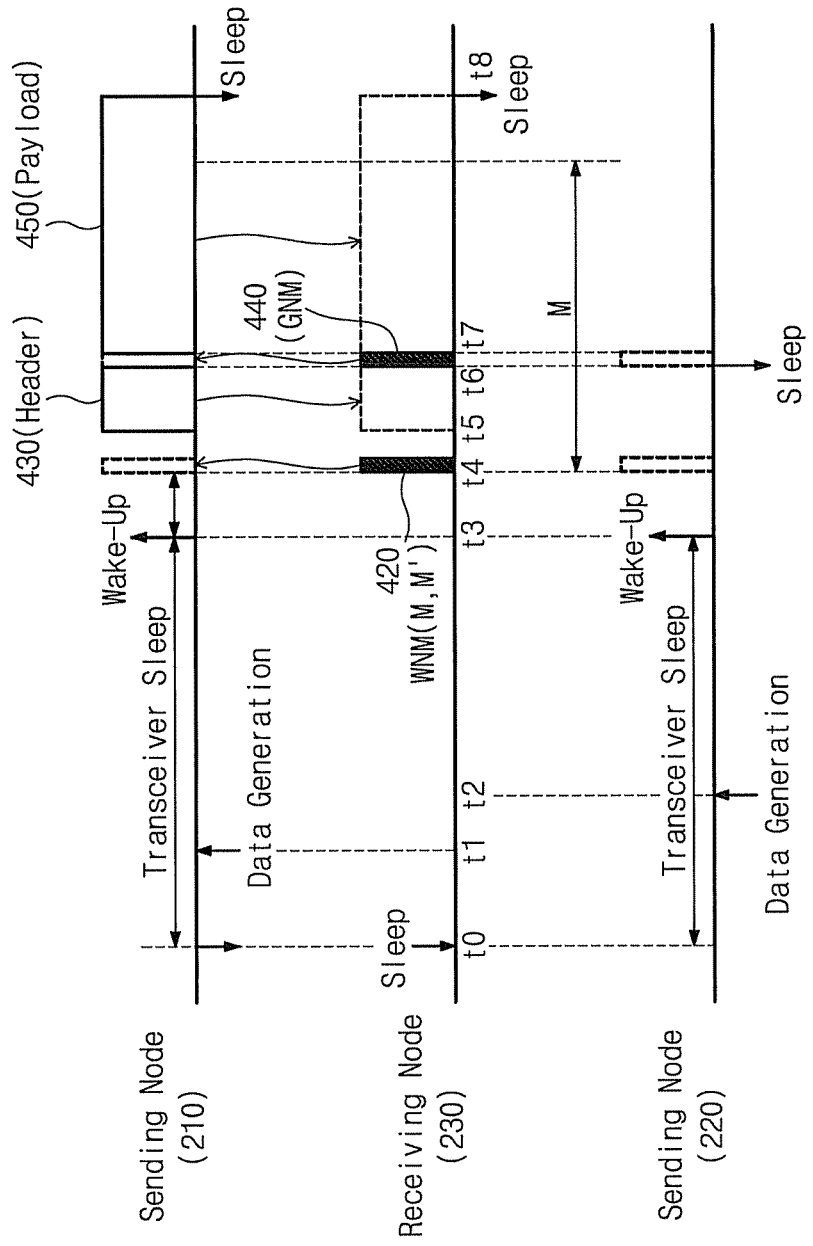
FIG. 5 is a timing diagram illustrating a data transmission method according to another embodiment.

FIG. 5 is a timing diagram illustrating a data transmission method according to another embodiment. Referring to FIG. 5, sending nodes 210 and 220 may predict a wake-up time of a receiving node 230. If the predicted wake-up time of the receiving node approaches, the sending nodes 210 and 220 may turn on a transceiver to provide for data transmission/reception.

The sending nodes 210 and 220 may determine turn-on times of the respective transceivers by referring to the generation cycle of a WNM transmitted by the receiving node 230. Alternatively, when the receiving node 230 is non-periodically woken up, the turn-on times of the respective transceivers may be adjusted by referring to a second time M' previously provided from the receiving node 230. The second time M' may be information indicating a time when the following WNM is generated. That is, at an expected time when the receiving node 230 is woken up, the transceivers of the sending nodes 210 and 220 may be turned on to wait for data transmission/reception.

If the receiving node 210 enters the sleep mode at a time t0, the sending nodes 210 and 220 may set a transceiver for exchanging data with the receiving node 210 to the sleep. Even when the transceiver is maintained in sleep mode, the sending nodes 210 and 220 may sense surrounding environment, or generate data.

The turn-on time of the transceiver by the sending nodes 210 and 220 may be differently set according to whether the wake-up operation is periodic or non-periodic. If the wake-up operation of the receiving node 230 is periodic, the sending nodes 210 and 220 may determine the wake-up (turn-on) time of the transceiver using a wake-up cycle of the receiving node 230.

On the other hand, if the wake-up operation of the receiving node 230 is non-periodic, the sending nodes 210 and 220 may predict the wake-up time of the receiving node using the second time M' included in the WNM transmitted by the receiving node 230. When the receiving node 230 is switched into the sleep mode, the sending nodes 210 and 220 may maintain the transceiver in sleep mode until the predicted time (a time shorter than M). If the predicted wake-up time of the receiving node 230 approaches, the sending nodes 210 and 220 may wake up the transceiver at a time t3.

After the sending nodes 210 and 220 wakes up the transceiver, the receiving node 230 may wake up at a time t4. Then, the sending nodes 210 and 220 may transmit a header 430 of generated data to the receiving node 230.

At a time t4, if a receiving node 230 is woken up, the receiving node 230 may transmit the WNM 420 to the sending nodes 210 and 220. The WNN may include the first time M or the second time M'.

The sending nodes 210 and 220 having received the WNM 420 may transmit the header 420 of the generated data to the receiving node 230 by referring to the first time M. Here, for convenience of explanation, it is assumed that the sending node 210 transmits the header 430 earlier. At a time t5, the header 430 transmitted by the sending node 210 may be delivered to the receiving node 230.

At a time t6, if the header 430 is normally transmitted from the sending node 210, the receiving node 230 may transmit a GNM 440 to the sending nodes 210 and 220. The GNM 440 may be a message of granting data transmission authority only to the sending node 210.

At a time t7, the sending node 210 may transmit the payload 405 of the generated data to the receiving node 230 in response to the GNM 440 from the receiving node 230. On the other hand, the sending node 220 may recognize that the data transmission authority was granted to another sending node, and enter the sleep mode. When the transmission of the payload 450 is completed within a notified wake-up time of the receiving node 230, the sending node 210 may enter the sleep mode immediately after the transmission of the payload 450 is completed. Then, the receiving node 230 may enter the sleep mode when the notified wake-up time elapses However, the transmission of the payload 450 from the sending node 210 may exceed the notified wake-up time. In this case, the receiving node 230 may continue the transmission of the payload 450 even though the notified wake-up time M elapses. Then, the receiving node 230 may enter the sleep mode after the transmission of the payload 350 is completed. The receiving node 230 may not enter the sleep mode until the transmission of the payload 450 is completed even though the notified wake-up time elapses. At a time t8 when the transmission of the payload 450 from the sending node 210 is completed, the receiving node 230 may enter the sleep mode.

According to the data transmission method described above, the sending nodes 210 and 220 may predict the wake-up time of the receiving node 230. Transceivers of the respective sending nodes 210 and 220 may be maintained in sleep mode until the predicted time. The life of a battery of a sensor node corresponding to a sending node can be elongated through the control of the sending nodes 210 and 220 described above.

Figure 6:
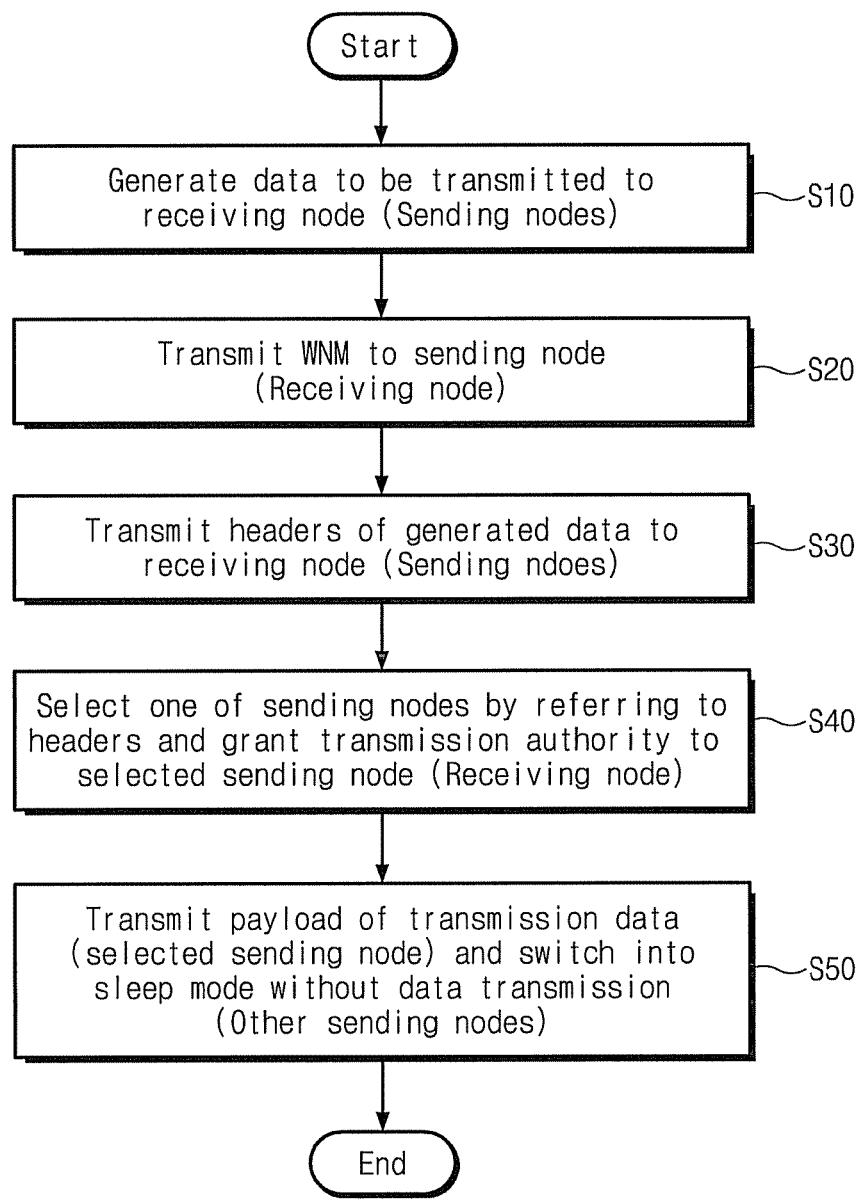
FIG. 6 is a flowchart illustrating a data transmission method according to an embodiment.

FIG. 6 is a flowchart illustrating operations of the sending/receiving nodes described in FIGS. 3 through 5. Referring to FIG. 6, a communication procedure between the sending nodes 210 and 220 and the receiving node 230 will be successively described in detail.

In operation S10, the sending nodes 210 and 220 may generate data to be transmitted to the receiving node 230. The transmission data may be data encoded in a format for transmitting sensing information detected around the sending nodes 210 and 220. Generally, the sensing information is converted into a packet unit. If the generation of the transmission data is completed, the sending nodes 210 and 220 may wait for a wake-up of the receiving node 230.

In operation S20, the receiving node 230 is woken up. The receiving node 230 may transmit a WNM to inform the sending nodes 210 and 220 that the receiving node 230 was woken up. Besides, the WNM may further include additional information. For example, the WNM may include a first time M during which the receiving node 230 is maintained in the wake-up state such that the sending nodes 210 and 220 can transmit data at a specific time. In addition, the WNM may further include a second time M' that notifies of the next wake-up time of the receiving node beforehand when the receiving node is woken up.

In operation S30, the sending nodes 210 and 220 may transmit a header of the generated transmission data to the receiving node 230 in response to the WNM. The sending nodes 210 and 220 may transmit the header of the transmission data during the wake-up state of the receiving node 230 by referring to the first time M included in the WNM.

In operation S40, the receiving node 230 may grant a transmission authority to the sending node 210 corresponding to the earliest transmitted header. That is, the receiving node 230 may transmit a GNM of allowing the data transmission only to the sending node 210 that has first transmitted a header.

In operation S50, the sending node 210 authorized to transmit data by the receiving node 230 may transmit the payload of the generated data. The selected sending node 210 may be switched into the sleep mode after the transmission of the payload is completed. However, the non-selected sending node 220 may be immediately switched into the sleep mode without data transmission in response to the GNM.

Figure 7:
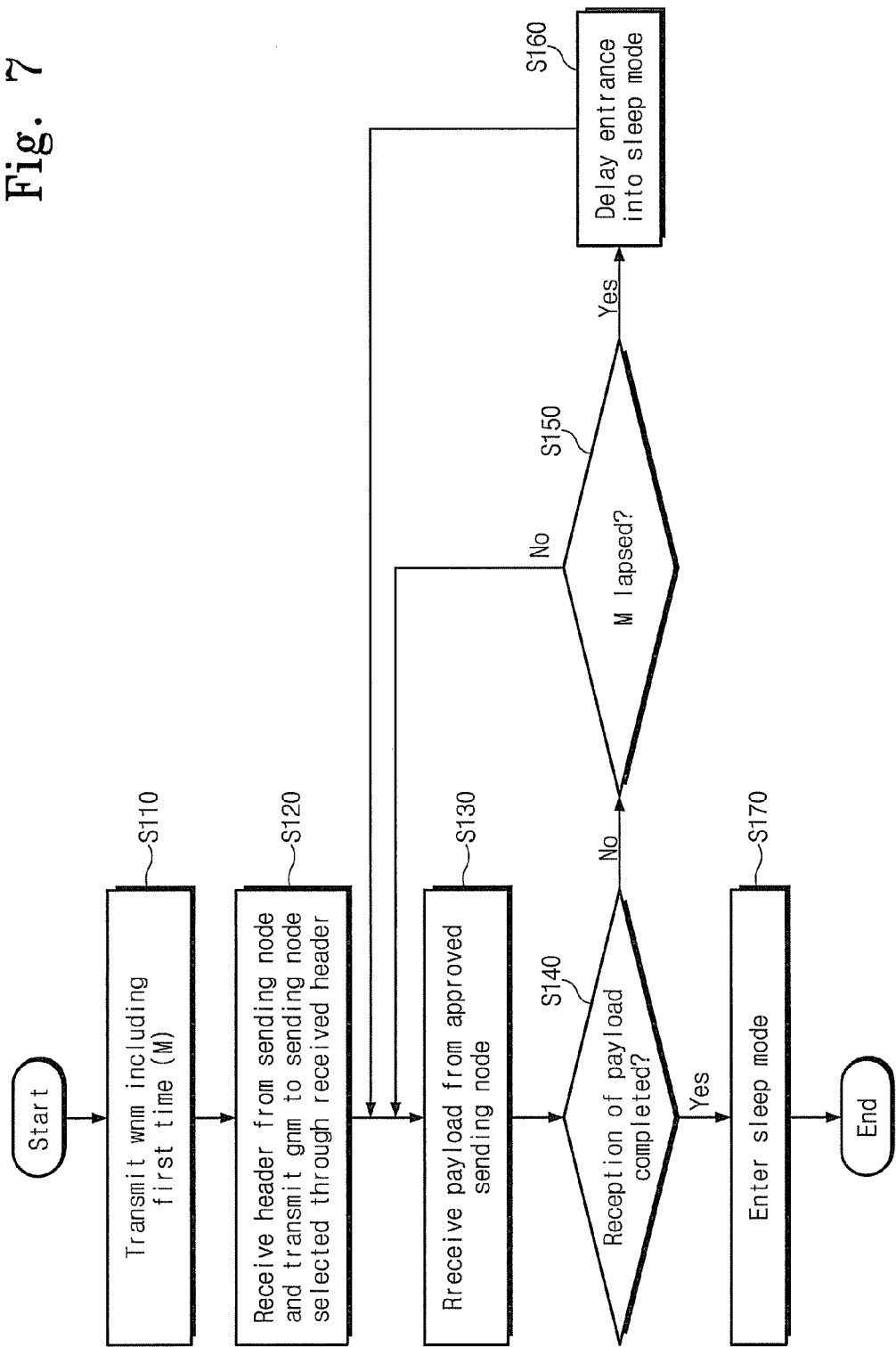
FIG. 7 is a flowchart illustrating an operation of a receiving node according to an embodiment.

FIG. 7 is a flowchart illustrating an operation of the receiving node 230 described in FIGS. 3 and 5. Referring to FIG. 7, a data-receiving procedure of the receiving node 230 will be described in detail.

The receiving node 230 may be woken up periodically or at a predicted time. Then, the receiving node 230 may transmit a WNM to adjacent receiving nodes 210 and 220. In operation S110, the WNM transmitted by the receiving node 230 may include a first time M during which the receiving node 230 is maintained in the wake-up state. Next, in operation S120, the receiving node 230 may receive a header of the data transmitted by the sending nodes 210 and 220. The receiving node 230 may select a sending node to transmit the data by referring to the received header. A GNM may be transmitted to the selected sending node.

In operation S130, the sending node 210 selected from the sending nodes having received the GNM may transmit a payload. On the other hand, the non-selected sending node may be switched into the sleep mode in response to the GNM. In operation S130, the receiving node 230 may receive the payload from the selected sending node 210.

In operation S140, the receiving node 230 may check whether the reception of the payload is completed. If the reception of the payload is completed, the receiving node 230 may enter the sleep mode in operation S170.

If the reception of the payload is not completed, the receiving node 230 may check whether the wake-up time or the first time M, of which the sending nodes have been notified, elapses or not in operation S150. If the first time M did not elapse, the procedure may move to operation S130 to continue the reception of the payload from the selected sending node.

If it is determined that the first time M has passed though the transmission of the payload from the selected sending node is not completed, then the procedure may move to operation S160, and the receiving node 230 may delay entrance into the sleep mode and continue the reception of the payload from the selected sending node.

Figure 8:
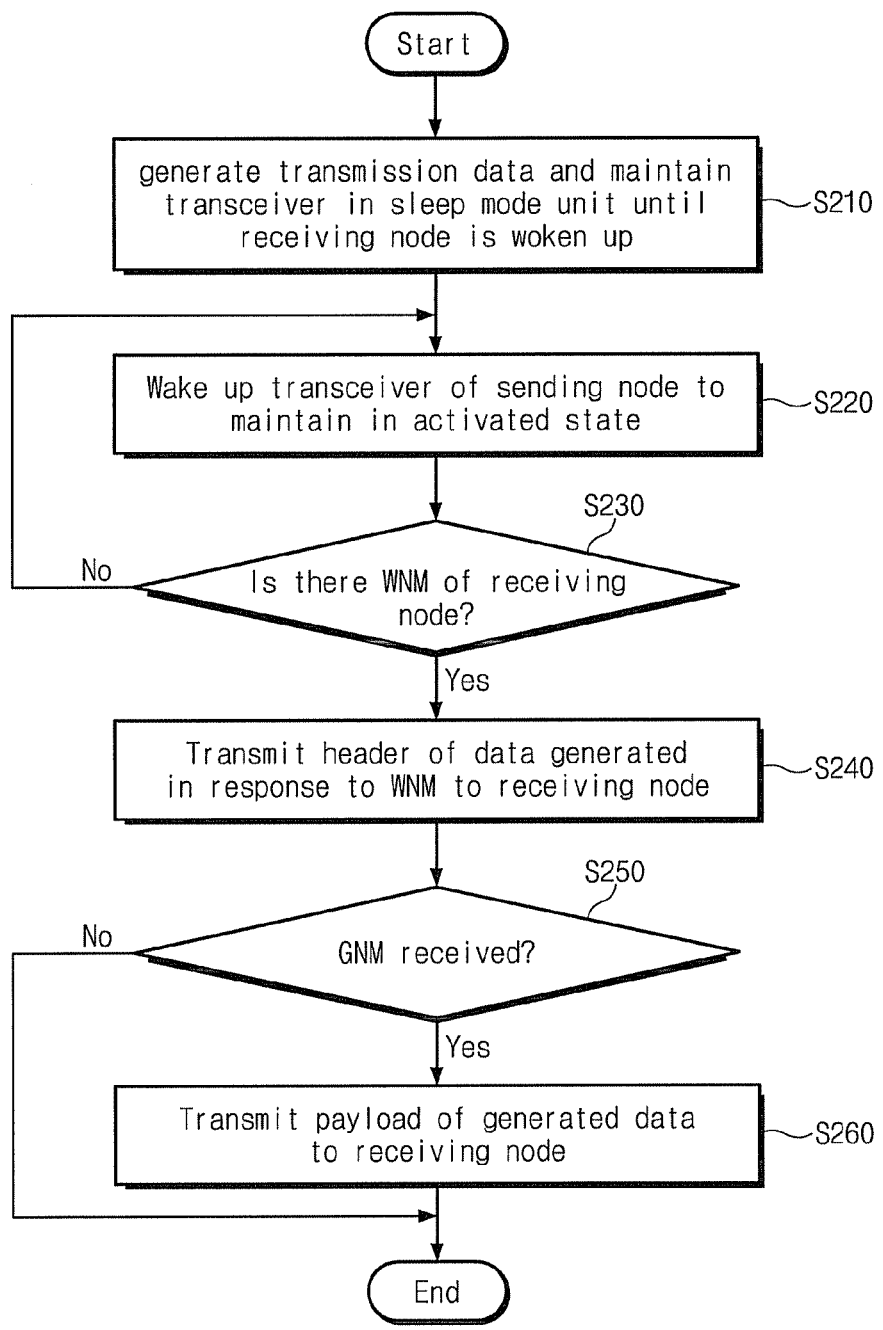
FIG. 8 is a flowchart illustrating operations of sending nodes according to an embodiment.

FIG. 8 is a flowchart illustrating operations of the sending nodes described in FIG. 5. The sending nodes 210 and 220 may detect a transmission period at which the receiving node 230 transmits a WNM to predict the next wake-up time of the receiving node 230.

In operation S210, the sending nodes 210 and 220 may calculate and predict the wake-up time of the receiving node 230 by referring to the time interval of the WNMs previously provided from the reception node 230. The sending nodes 210 and 220 may maintain a transceiver in sleep mode by referring to the predicted time from a time when the receiving node 230 enters the sleep mode. Here, the transceiver may be maintained in sleep mode, but all of the internal functions such as data processing operation and sensing may be maintained in an activated state.

In operation S220, if the predicted time approaches, the sending nodes 210 and 220 may wake up the respective transceiver to wait for data transmission or reception.

In operation S230, the sending nodes 210 and 220 may monitor whether the receiving node 230 transmits a WNM. If a WNM from the receiving 230 is not detected, the sending nodes 210 and 220 may keep monitoring. However, if the sending nodes 210 and 220 receive a WNM, the procedure may move to operation S240.

In operation S240, the sending nodes 210 and 220 may transmit a header of the generated data to the receiving node 230. A plurality of sending nodes 210 and 220 may be driven in a random back-off manner to transmit the headers, but embodiments are not limited thereto.

In operation S250, the sending nodes 210 and 220 may wait until the receiving node 230 selects one of the sending nodes. Then, the sending nodes 210 and 220 may determine whether or not a GNM transmitted from the receiving node 230 indicates one of the sending nodes 210 and 220.

If the GNM indicates one of the sending nodes 210 and 220, the sending node 210 or 220 may transmit a payload of a previously generated packet. However, if the GNM indicates another sending node, the sending nodes 210 and 220 may stop the data transmission and maintain the transceiver in sleep mode.

According to the data transmission methods described above, the sensor networks according to the embodiments can inhibit data conflicts between sending nodes, thereby enhancing reliability of a network. Additionally, the data transmission methods can reduce the duty cycle of sensor nodes. Therefore, the life of the sensor network can be considerably increased.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A data transmission method of a sending node among a plurality of sending nodes in a sensor network, the method comprising:
   generating data to be transmitted to a receiving node;
   transmitting headers of the generated data to the receiving node in response to a Wake-up Notification Message (WNM) from the receiving node;
   receiving a Grant Notification Message (GNM) from the receiving node, the GNM authorizing one sending node among the plurality of sending nodes to transmit a payload of the generated data;

transmitting the payload of the generated data when the sending node is the authorized sending node; and switching into sleep mode without data transmission when the sending node is not the authorized sending node.

2. The data transmission method of claim 1, wherein the WNM comprises time information that comprises information on a duration during which the receiving node maintains a wake-up state after the transmission of the WNM.

3. The data transmission method of claim 2, wherein, by referring to the time information, the plurality of sending nodes transmit the headers of the generated data within the duration during which the receiving node maintains the wake-up state.

4. The data transmission method of claim 3, wherein the plurality of sending nodes transmit the headers of the generated data sequentially by predetermined sequence within the duration.

5. The data transmission method of claim 2, wherein the time information is determined according to the number of the plurality of sending nodes that compete with each other to transmit the payload of the generated data to the receiving node.

6. The data transmission method of claim 5, wherein the plurality of sending nodes predict a generation time of the WNM, and maintain the respective transceivers in the sleep mode until the predicted generation time after being switched into the sleep mode.

7. The data transmission method of claim 6, wherein the predicted generation time is earlier than a time when the WNM is generated.

8. The data transmission method of claim 7, wherein, by referring to the time information, the plurality of sending nodes predict the time when the next WNM is generated, and maintain respective transceiver in the sleep mode until the predicted time after being switched into the sleep mode.

9. The data transmission method of claim 1, wherein the plurality of sending nodes maintains respective transceivers in the sleep mode by referring to a generation cycle of the WNM.

10. The data transmission method of claim 1, wherein, in the transmitting of the headers of the generated data to the receiving node in response to the Wake-up Notification Message (WNM) from the receiving node, if the WNM is non-periodically generated, the WNM comprises information on a time when a next WNM is generated.

11. The data transmission method of claim 1, further comprising:

combining, by the receiving node, the header and the payload received from the selected sending node into one packet; and performing an integrity test on the combined packet.

12. The data transmission method of claim 1, wherein the receiving node selects one of the plurality of sending nodes by referring to the headers.

13. The data reception method of claim 12, further comprising transmitting the WNM of the receiving node to the plurality of sending nodes.

14. The data reception method of claim 12, further comprising:

combining, by the receiving node, the header and the payload received from the selected sending node into one packet; and performing an integrity test on the combined packet.

15. A data reception method of a receiving node in a sensor network, the method comprising:

receiving headers of data generated by a plurality of sending nodes in response to the plurality of sending nodes receiving a Wake-up Notification (WNM) message from the receiving node;

selecting one of the plurality of sending nodes by referring to the earliest received headers;

transmitting a Grant Notification Message (GNM) to a selected sending node, the GNM authorizing the selected sending node among the plurality of sending nodes to transmit a payload of the generated data; and receiving a payload of the data provided from the selected sending node authorized by the GNM.

16. The data reception method of claim 15, wherein the plurality of sending nodes transmit the headers in response to the WNM.

17. The data reception method of claim 15, wherein the WNM comprises time information indicating a duration during which the receiving node maintains a wake-up state after the transmission of the WNM.

* * * * *